US006987247B2

(12) United States Patent
Schaffeld et al.

(10) Patent No.: US 6,987,247 B2
(45) Date of Patent: Jan. 17, 2006

(54) PORTABLE SLOW COOKER

(75) Inventors: John Schaffeld, Lexinton, MA (US); Paul Metaxtos, Charlestown, MA (US); Steffen Koury, Chelsea, MA (US)

(73) Assignee: Salton, Inc., Lake Forest, IL (US)

( * ) Notice: Subject to any disclaimer, the term of this patent is extended or adjusted under 35 U.S.C. 154(b) by 98 days.

(21) Appl. No.: 10/750,327

(22) Filed: Dec. 31, 2003

(65) Prior Publication Data

US 2005/0145615 A1 Jul. 7, 2005

(51) Int. Cl.
*B65D 45/00* (2006.01)
*A47J 36/10* (2006.01)

(52) U.S. Cl. ...................................... 219/438; 220/318

(58) Field of Classification Search ........ 219/429–434, 219/439, 440; 220/315, 318, 345.2, 345.6, 220/378, 694.1, 760
See application file for complete search history.

(56) References Cited

U.S. PATENT DOCUMENTS 2,524,558 A * 10/1950 Burkhardt .................. 220/315
4,179,039 A * 12/1979 Kawolics .................... 220/319
4,351,449 A * 9/1982 Zobel ......................... 220/318
5,044,513 A * 9/1991 Van Berne .................. 220/318
5,337,910 A * 8/1994 Picozza et al. .......... 220/367.1
2003/0197014 A1 * 10/2003 Muchin et al. ............. 220/318

FOREIGN PATENT DOCUMENTS

JP 09-327395 A * 12/1997

* cited by examiner

*Primary Examiner*—Joseph Pelham
(74) *Attorney, Agent, or Firm*—Sonnenschein Nath & Rosenthal LLP

(57) ABSTRACT

The present invention relates to a sealing apparatus on a portable slow cooker. The sealing apparatus includes a handle, a latch and a gasket. The gasket is positioned between the lid and the heating vessel of the slow cooker. The handle is hingedly attached to the slow cooker and has a lowered position and a raised position. The latch is hingedly attached to the heating vessel, and has a locked position and an unlocked position. When the handle is in the lowered position, the latch is in the unlocked position and the lid is removable from the heating vessel. When the handle is in the raised position, the latch is in the locked position and the lid is sealed onto the heating vessel.

15 Claims, 4 Drawing Sheets

PORTABLE SLOW COOKER

FIELD OF THE INVENTION

The present invention relates generally to a cooking appliance, and more specifically to a sealing mechanism to secure a lid onto the body of a slow cooker to prevent liquids from spilling while carrying the appliance. The present invention also relates to a method and system for sealing the lid onto the body of the slow cooker.

BACKGROUND OF THE INVENTION

Conventional cooking appliances (e.g., pots and slow cookers) typically include side handles to carry the appliance from one location to another. Because the lid is not sealed onto the body of the appliance, however, the contents are easily spilled if the appliance is not held in an upright position. One solution has been to secure the lid onto the body of the appliance using a rubber band. However, this solution is awkward and not very secure. Thus, there is a need for a simple and reliable apparatus for sealing the lid onto the body of the appliance to carry the appliance without fear of spilling the contents.

SUMMARY OF THE INVENTION

In accordance with the present invention, a cooking appliance is provided comprising a pot, a handle, a lid, a gasket, and a latch hingedly attached to the pot. The handle is hingedly attached to the pot, and has a lowered position and a raised position. The lid is configured to fit on the pot to cover the opening of the pot. The gasket is positioned between the pot and the lid when the lid is placed on the pot. The latch has a locked position and an unlocked position. When the handle is in the lowered position, the latch is in the unlocked position and the lid is removable from the pot. When the handle is in the raised position, the latch is in the locked position and the lid is sealed onto the pot.

In accordance with the present invention, a sealing apparatus is provided for a slow cooker having a heating vessel and a lid configured to fit on the heating vessel to cover the opening of the heating vessel. The sealing apparatus comprises a handle, a gasket and a latch hingedly attached to the heating vessel. The handle is hingedly attached to the heating vessel, and has a lowered position and a raised position. The gasket is positioned between the heating vessel and the lid when the lid is placed on the heating vessel. The latch has a locked position and an unlocked position. When the handle is in the lowered position, the latch is in the unlocked position and the lid is removable from the heating vessel. When the handle is in the raised position, the latch is in the locked position and the lid is sealed onto the heating vessel.

In accordance with another embodiment of the present invention, a method for sealing a lid onto a slow cooker is provided. The method comprises the steps of raising a handle hingedly attached to the slow cooker, and engaging a latch attached to the slow cooker, wherein the latch seals the lid onto the slow cooker.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings.

DETAILED DESCRIPTION OF THE INVENTION

Figure 1:
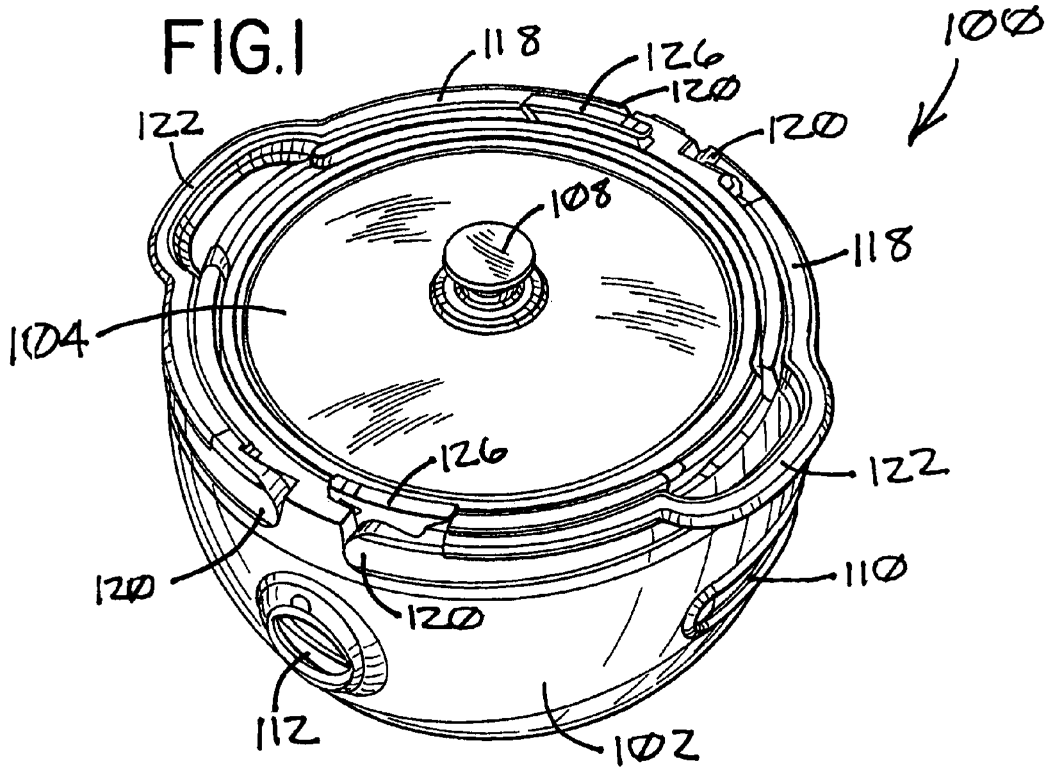
FIG. 1 depicts a perspective view of one embodiment of the cooking appliance with the handles in the lowered position, in accordance with the present invention.
Figure 2:
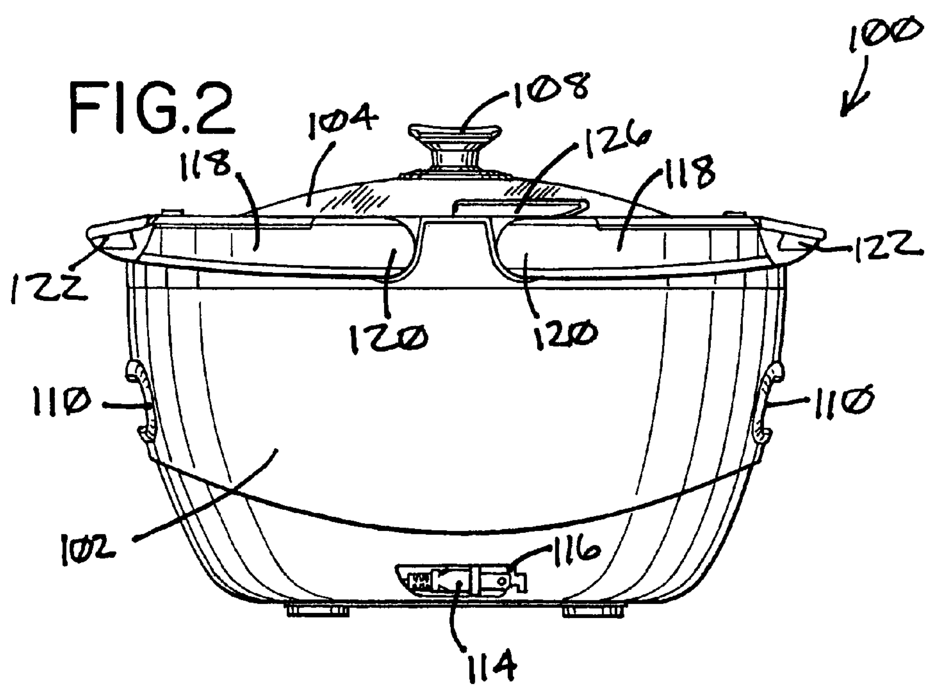
FIG. 2 depicts a back view of the cooking appliance shown in FIG. 1.
Figure 3:
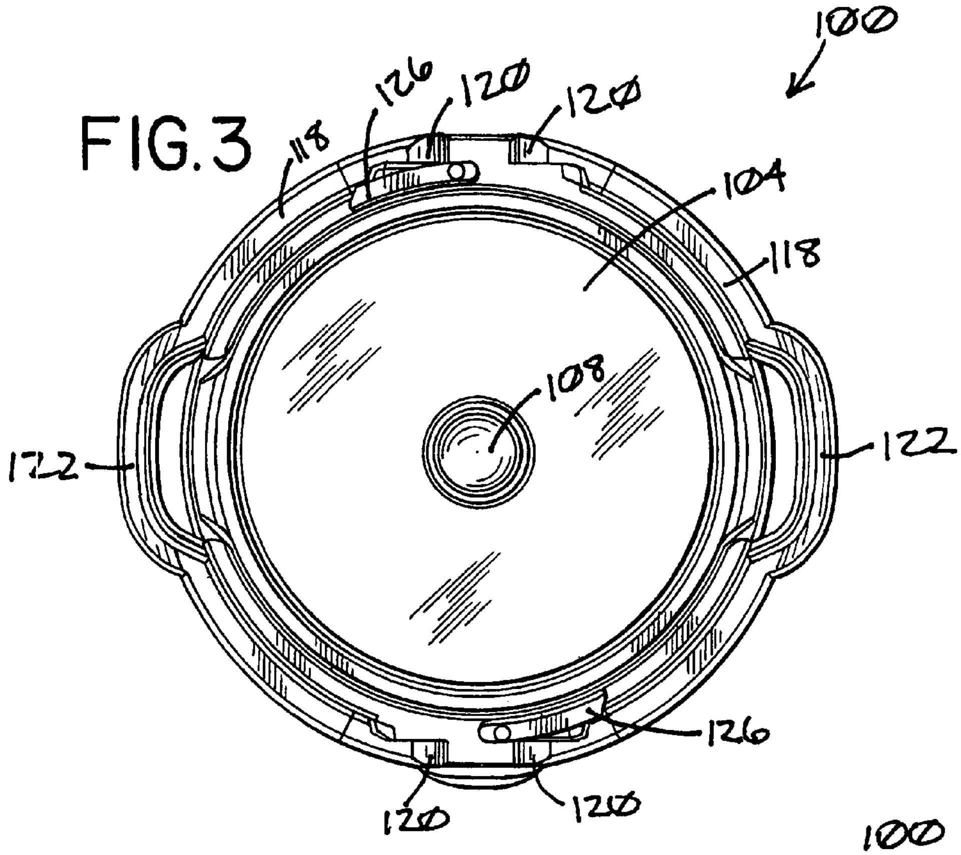
FIG. 3 depicts a top view of the cooking appliance shown in FIG. 1.
Figure 4:
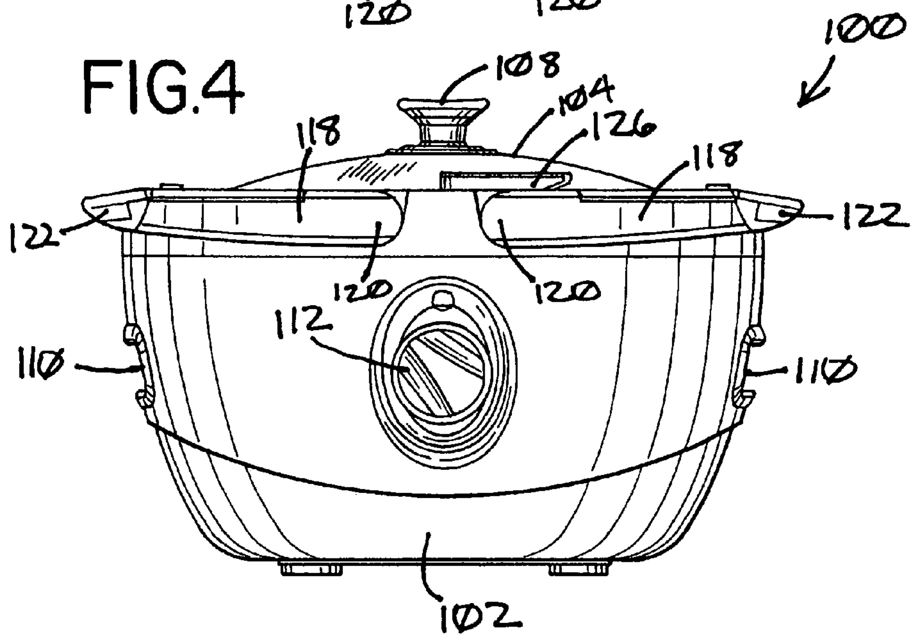
FIG. 4 depicts a front view of the cooking appliance shown in FIG. 1.
Figure 5:
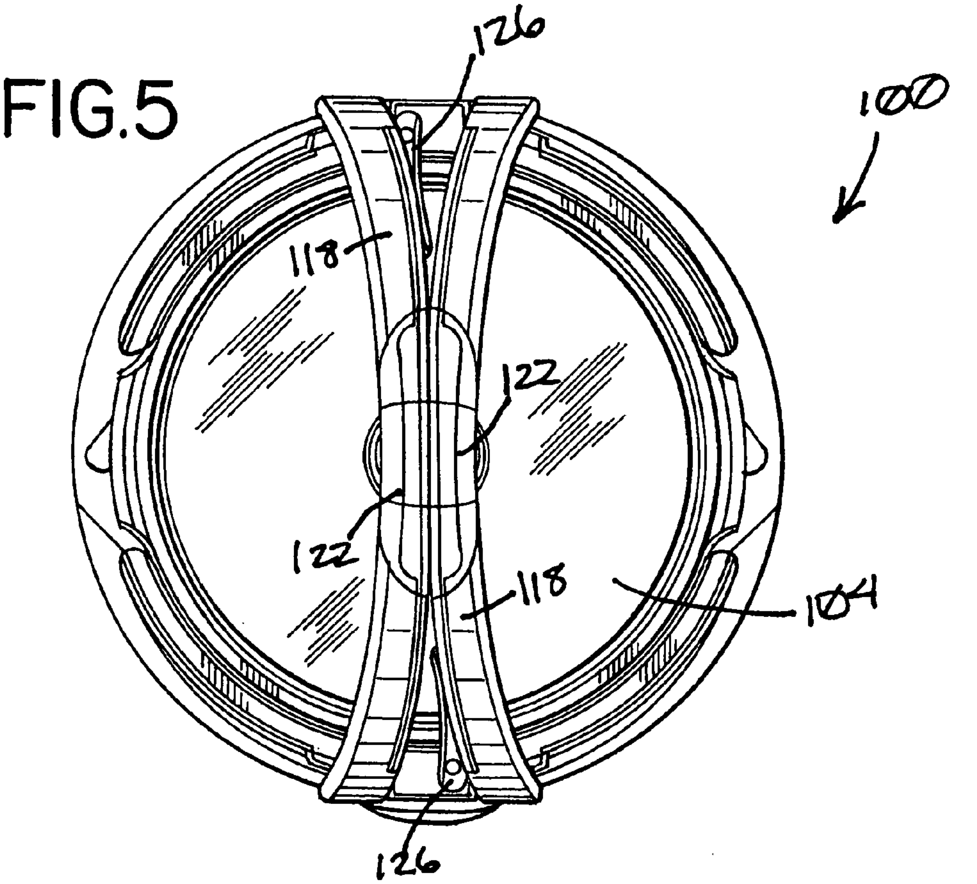
FIG. 5 depicts a top view of the cooking appliance shown in FIG. 1 with the handles in the raised position.
Figure 6:
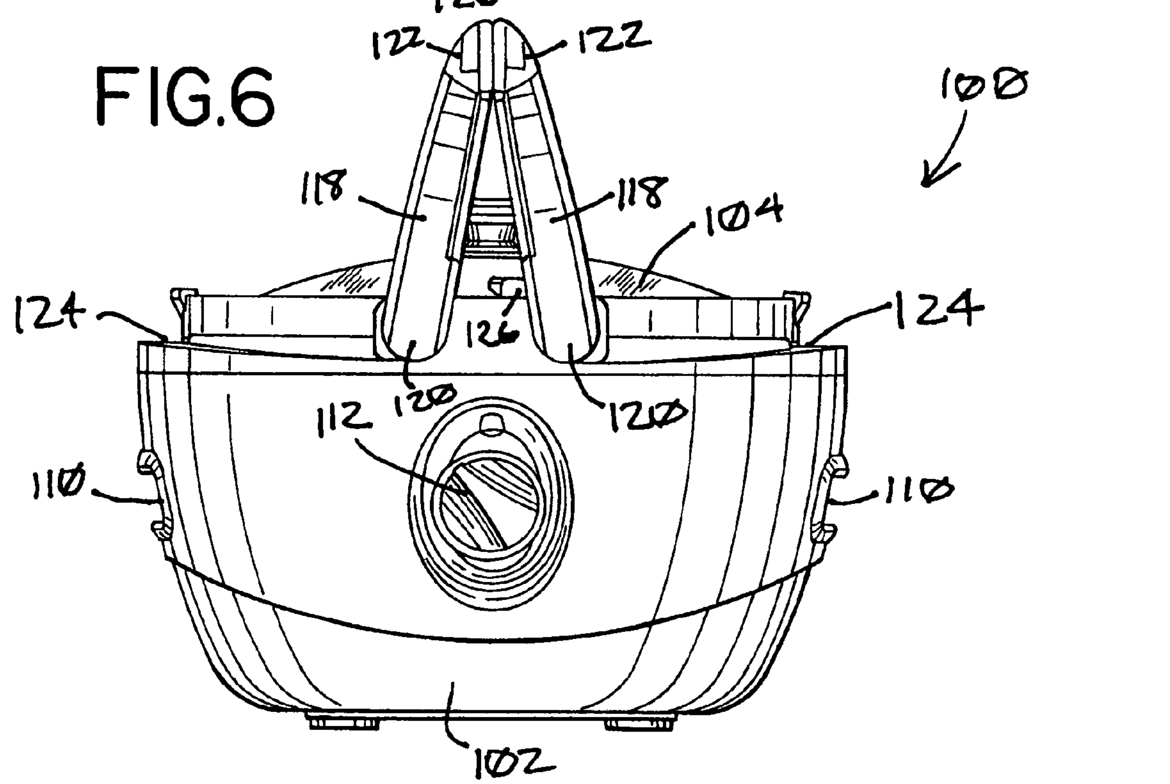
FIG. 6 depicts a front view of the cooking appliance shown in FIG. 5.

Reference will now be made in detail to implementations consistent with the present invention as illustrated in the accompanying drawings. Wherever possible, the same reference numbers will be used throughout the drawings and the following description to refer to the same or like parts.

Although described for use in a slow cooker, one skilled in the art will appreciate that the present invention can be used in any type of cooking appliance, such as a pot, a rice cooker, etc.

FIGS. 1–6 depict one embodiment of a slow cooker 100. The slow cooker 100 has a heating vessel 102 and a lid 104. The lid 104 is configured to fit on the heating vessel 102 to cover the opening of the heating vessel 102. A gasket 106 is positioned between the heating vessel 102 and the lid 104 when the lid 104 is placed on the heating vessel 102. The gasket 106 may be attached to the lid 104 or to the heating vessel 102. The lid 104 has a knob 108 to remove the lid 104 from the heating vessel 102. Consistent with standard slow cookers, the heating vessel 102 has two side handles 110, a control panel 112, and an electric cord 114. The electric cord 114 can be stored in a cavity 116 in the heating vessel 102. Alternatively, the electric cord 114 can be removable from the heating vessel 102.

Figure 7:
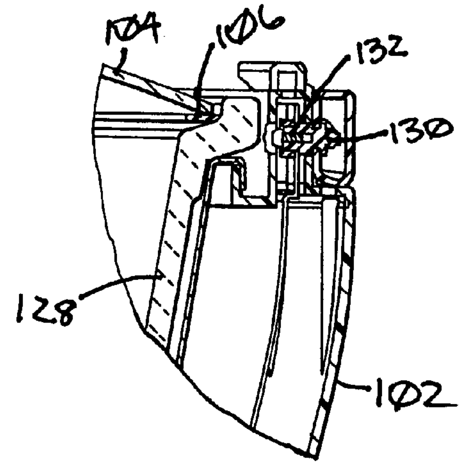
FIG. 7 depicts a cross-section of the handle shown in lowered position, in accordance with the present invention.
Figure 8:
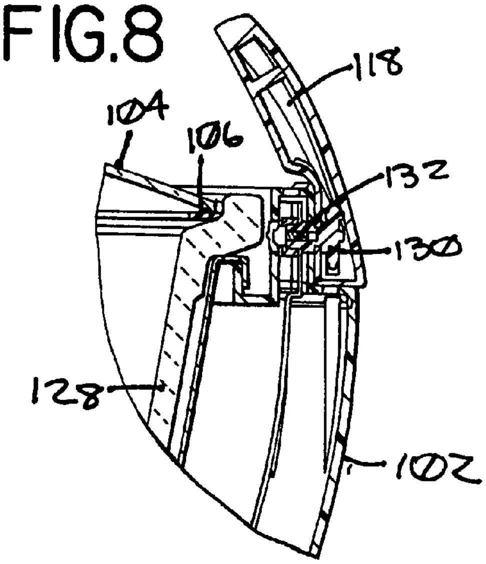
FIG. 8 depicts a cross-section of the handle shown in raised position, in accordance with the present invention.

The heating vessel 102 has two main handles 118. Each of the handles 118 has two ends 120 that are hingedly attached to the heating vessel 102 near the opening of the heating vessel 102 and a gripping portion 122 at the center of the handle 118. The ends 120 of the handles 118 are hingedly connected to the heating vessel 102 using support 130 and screw 132, as depicted in FIGS. 7 and 8.

The handles 118 have a lowered position (see FIGS. 1–4, 7 and 9) and a raised position (see FIGS. 5–6, 8 and 10). The heating vessel 102 includes a ledge 124 in which the handles 118 rest when the handles 118 are in the lowered position.

Latches 126 are hingedly connected to the heating vessel 102 to seal the lid 104 onto the heating vessel 102. The latches 126 have a locked position (see FIGS. 5, 6, 8, and 10) and an unlocked position (see FIGS. 1–4, 7, and 9). When the handles 118 are in the lowered position, the latches 126 are in the unlocked position, and the lid 104 is removable from the heating vessel 102. When the handles 118 are in the raised position, the latches 126 are in the locked position and the lid 104 is sealed onto the heating vessel 102. In particular, as the handles 118 are raised, they engage the latches 126, causing the latches 126 to rotate to the locked position.

Figure 9:
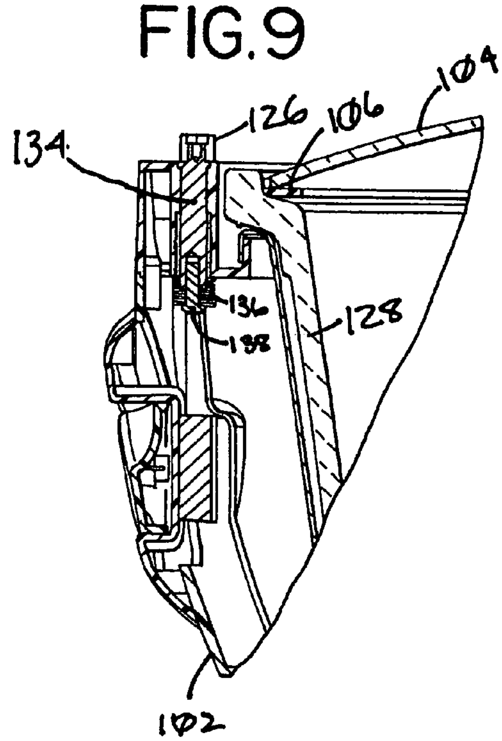
FIG. 9 depicts a cross-section of the latching mechanism shown in unlocked position, in accordance with the present invention.
Figure 10:
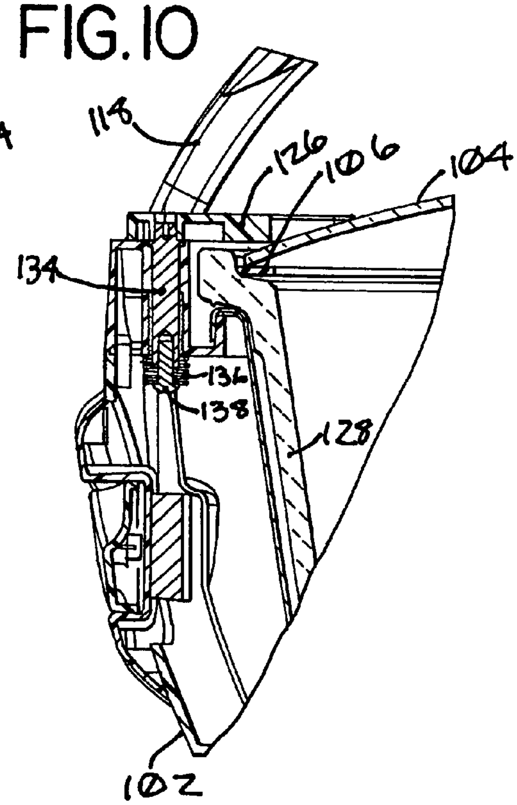
FIG. 10 depicts a cross-section of the latching mechanism shown in locked position, in accordance with the present invention.

As depicted in FIGS. 9 and 10, the latch 126 is connected to a torsion bar 134, and a screw 138 connects a spring 136 to the torsion bar 134. Rotating the latches 126 to the locked position rotates torsion bar 134 and screw 138, causing spring 136 to extend, as depicted in FIG. 10. Thus, as the handles 118 are lowered, spring 136 causes the latches 126 to return to the unlocked position.

The slow cooker 100 includes an inner pot 128 to hold the items to be cooked. Inner pot 128 is easily removable from the slow cooker 100 for cleaning.

While various embodiments of the present invention have been described, it will be apparent to those of skill in the art that many more embodiments and implementations are possible that are within the scope of this invention. Accordingly, the present invention is not to be restricted except in light of the attached claims and their equivalents.

What is claimed is:

1. A cooking appliance, comprising:
- a pot having an opening;
- a handle hingedly attached to the pot, the handle having a lowered position and a raised position;
- a lid configured to fit on the pot to cover the opening;
- a gasket, wherein the gasket is positioned between the pot and the lid when the lid is placed on the pot; and
- a latch hingedly attached to the pot, wherein:
  - the latch has a locked position and an unlocked position;
  - when the handle is in the lowered position, the latch is in the unlocked position and the lid is removable from the pot; and
  - when the handle is in the raised position, the latch is in the locked position and the lid is sealed onto the pot.

2. The cooking appliance of claim 1, wherein the handle engages the latch when the handle is in the raised position.

3. The cooking appliance of claim 1, wherein the handle has two ends and each of the ends is hingedly attached to the pot near the opening.

4. The cooking appliance of claim 1, wherein the pot comprises an electric heating unit.

5. The cooking appliance of claim 4, further comprising:
- an electric cord to supply the heat to the pot; and
- a cavity in the pot to store the electric cord.

6. The cooking appliance of claim 1, wherein the gasket is attached to the lid.

7. The cooking appliance of claim 1, wherein the gasket is attached to the pot.

8. The cooking appliance of claim 1, further comprising:
- a second handle hingedly attached to the pot, the second handle having a lowered position and a raised position; and
- a second latch hingedly attached to the pot, wherein:
  - the second latch has a locked position and an unlocked position;
  - when the second handle is in the lowered position, the second latch is in the unlocked position and the lid is removable from the pot; and
  - when the second handle is in the raised position, the second latch is in the locked position and the lid is sealed onto the pot.

9. A sealing apparatus for a slow cooker having a heating vessel with an opening and a lid configured to fit on the heating vessel to cover the opening, the sealing apparatus comprising:
- a handle hingedly attached to the heating vessel, the handle having a lowered position and a raised position;
- a gasket, wherein the gasket is positioned between the heating vessel and the lid when the lid is placed on the heating vessel; and
- a latch hingedly attached to the heating vessel, wherein:
  - the latch has a locked position and an unlocked position;
  - when the handle is in the lowered position, the latch is in the unlocked position and the lid is removable from the heating vessel; and
  - when the handle is in the raised position, the latch is in the locked position and the lid is sealed onto the heating vessel.

10. The sealing apparatus of claim 9, wherein the handle engages the latch when the handle is in the raised position.

11. The sealing apparatus of claim 9, wherein the handle has two ends and each of the ends is hingedly attached to the heating vessel near the opening.

12. The sealing apparatus of claim 9, wherein the gasket is attached to the lid.

13. The sealing apparatus of claim 9, wherein the gasket is attached to the heating vessel.

14. The sealing apparatus of claim 9, further comprising:
- a second handle hingedly attached to the heating vessel, the second handle having a lowered position and a raised position; and
- a second latch hingedly attached to the heating vessel, wherein:
  - the second latch has a locked position and an unlocked position;
  - when the second handle is in the lowered position, the second latch is in the unlocked position and the lid is removable from the heating vessel; and
  - when the second handle is in the raised position, the second latch is in the locked position and the lid is sealed onto the heating vessel.

15. A method for sealing a lid onto a pot, comprising the steps of:
- placing a gasket between the lid and the pot;
- raising a handle hingedly attached to the pot;
- engaging a latch attached to the pot, wherein the latch seals the lid onto the pot;
- raising a second handle hingedly attached to the pot; and
- engaging a second latch attached to the pot.

* * * * *